Jan. 14, 1958   L. W. H. PEARCE ET AL   2,819,919
METAL PACKING FOR ROTARY AND RECIPROCATING SHAFTS
AND THE METHOD OF MAKING THE SAME
Filed Nov. 14, 1955
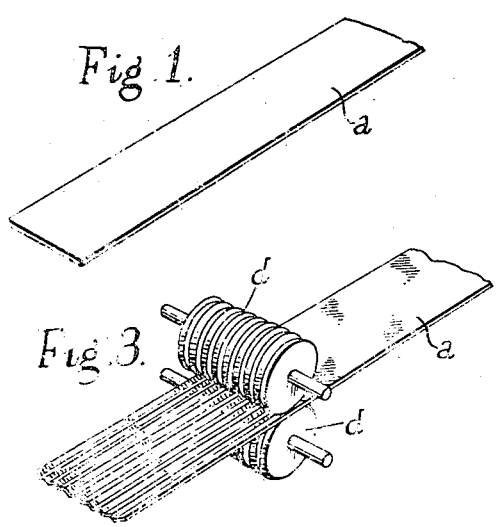
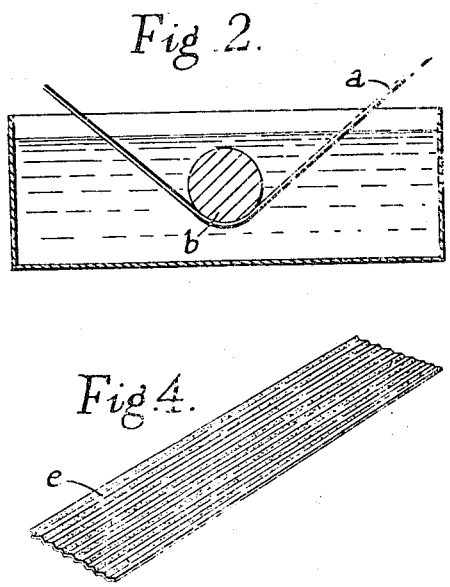
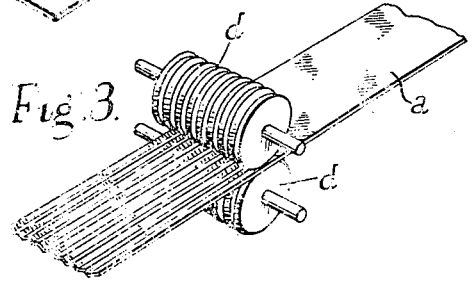
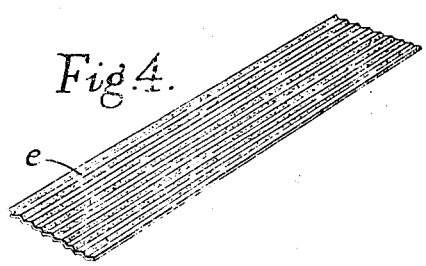
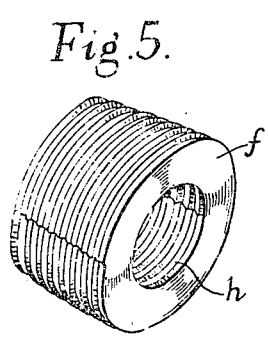
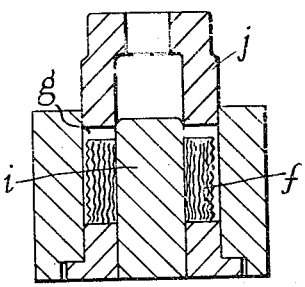
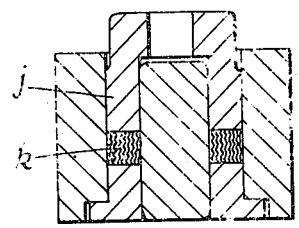
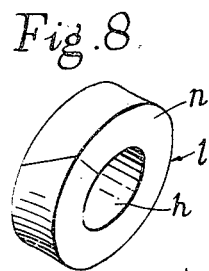
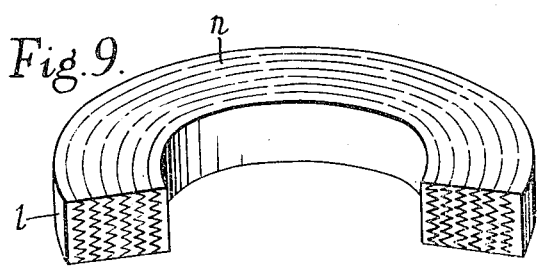
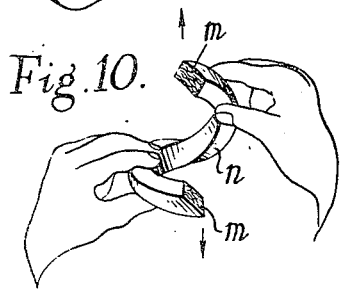
INVENTORS
Louis William Henry Pearce
Rodney Vernon Jones
BY
ATTORNEY United States Patent Office 2,819,919
Patented Jan. 14, 1958

2,819,919

METAL PACKING FOR ROTARY AND RECIPROCATING SHAFTS AND THE METHOD OF MAKING THE SAME

Louis William Henry Pearce and Rodney Vernon Jones, Woking, England, assignors to James Walker and Company Limited, Surrey, England, a corporation of Great Britain Application November 14, 1955, Serial No. 546,613

2 Claims. (Cl. 288—15)

This invention relates to metal and other packings for rotary and reciprocating shafts and it has for its object to provide an improved packing of this type which shall possess stability and also a degree of compressibility greater than is possessed by other similar packings.

The present invention consists of a packing consisting of a compressed body which is composed of a plural number of thin lamina having a lubricating film permanently confined between their opposing faces.

The invention also consists of a packing consisting of a compressed annular body which is composed of a plural number of thin convolutions having a lubricating film permanently confined between their opposing faces.

In a preferred embodiment of the invention the body of the packing is in the shape of a split or solid annular ring and composed of a plural number of tightly wound convolutions of longitudinally corrugated and lubricant coated thin ductile metal, for example white metal, aluminum or copper, about one thousandth of an inch thick, but not exceeding six thousandths of an inch. The lubricant may consist of oil alone or a combination of oil and powdered graphite or other suitable lubricant.

A packing according to the present invention may be made by building up an oversize body from one or more thin strips of lubricant coated and flat or corrugated ductile metal or other suitable material and compressing said oversize body to the finished size by applying pressure to the said body in the direction of the edges of the metal or other laminae or convolutions.

The preferred method of making a packing according to the present invention consists in drawing a single length of thin flat metal strip firstly through a bath containing lubricating oil and then between opposing corrugating pressure rollers to form a longitudinally corrugated metal strip coated with lubricating oil, by winding said oil coated corrugated strip around a spindle to form an oversize body made up of a plural number of convolutions and compressing said oversize body to the finished size by applying pressure in the direction of the edges of the metal convolutions.

In order that the invention may be clearly understood a metal packing according to the preferred embodiment of the invention and its manufacture by the above method will now be described, by way of example, by aid of the accompanying drawings in which:

Fig. 1 shows a fragment of the metal strip in its basic condition.

Fig. 2 is a section through the oil bath with a metal strip in process of being coated with oil.

Fig. 3 is a view in perspective showing the oiled metal strip being pulled through a pair of corrugating pressure rollers.

Fig. 4 shows a fragment of the corrugated and oiled metal strip after the application thereto of a dusting of powdered graphite or the like.

Fig. 5 illustrates the oversize body produced by rolling the corrugated and oiled metal strip around a winding spindle, not shown, a plural number of times.

Fig. 6 is a section through a four-piece die with the body shown in Fig. 5 in position ready to be compressed to the finished size.

Fig. 7 is a view of the same die showing the body fully compressed.

Fig. 8 is a perspective view of the compressed packing body now in the form of a solid annular ring.

Fig. 9 is a perspective view of the compressed packing to an enlarged scale with a section removed and showing in exaggerated form the interengagement between the corrugations produced by the winding and compressing.

Fig. 10 is a perspective view illustrating the manner in which the metal packing, after being split can be opened out to fit the same over a shaft without causing relative separation and distortion of the convolutions.

The metal packing illustrated in the drawings is made by winding a long strip of thin corrugated and oiled metal tightly around a spindle to produce an oversize body in the form of an unsplit annular ring and then compressing this body to its finished size in a four-piece die and this method will now be described by reference to the figures in the drawings.

The starting material is in the form of a comparatively narrow strip of thin ductile metal such as white metal, copper, or aluminum having flat surfaces such as shown in Fig. 1 and indicated by the reference $a$.

The first step in the process of converting the strip $a$ into a finished packing is shown in Fig. 2 and consists in drawing the metal strip under a roller $b$ within a tank $c$ containing a lubricating oil to a level such that the roller $b$ and the metal strip passing beneath it will be immersed in the oil. This operation will cause the metal strip to have both its faces covered with a film of oil and closely following its immersion in the oil the metal strip is drawn between a pair of corrugating pressure rollers $d$ as shown in Fig. 3. This effects the corrugating of the metal strip $a$. The next step in the process may be the application of a dusting of powdered graphite over one or both the oily corrugated surfaces to produce the corrugated metal strip $e$ shown in Fig. 4 ready for winding to the form shown in Fig. 5.

The winding of the metal strip is not illustrated in the drawings but it may simply be done by and around a hand or power revolved spindle and this action may conveniently be used to draw the strip through the oil bath and the corrugating rollers.

The winding up of the strip is continued until sufficient turns or convolutions have been wound on to form an oversize body of the required diameter. This oversize body is indicated by the reference $f$ in Fig. 5.

The oversize body $f$ after having been removed from the winding spindle is placed in the annular recess $g$ of the female portion of a four-part die or mould shown in Fig. 6 with the central hole $h$ of the body $f$ positioned over the central projection $i$ of the die which has a diameter equal to the required diameter of the hole in the finished packing.

The body $f$ is then compressed by the application of pressure to the annular male portion $j$ of the die until the body $f$ assumes the proportion of the body indicated at $k$ in Fig. 7.

The compressing of the oversize body $f$ by the application of pressure to the edges of the convolutions formed by winding the metal strip around a spindle results in the flattening of the corrugations and the permanent imprisonment of the lubricant between the opposing surfaces as well as effecting a substantial decrease in the width of the non-compressed body $f$. The resulting flattening of the corrugations is illustrated in an exaggerated manner in Fig. 9. The compressed body takes the form of an annular ring $l$ shown in Fig. 8.

When the packing ring is required to be opened and to fit the same over a shaft, the ring $l$ is split when it may be opened by twisting the ends laterally in the manner shown in Fig. 10 and when in position on the shaft the two ends are twisted in the opposite directions to bring the split faces $m$ opposite to each other. By thus opening the packing ring distortion and relative separation of the metal layers or convolutions does not occur but separation by separating the ends when kept in the same plane will cause the metal layers to separate.

The finished packing as made by the dies illustrated will have flat parallel side faces $n$ but these may be of any other suitable shape such as curved or conical and either on both sides so that in a series of packings the individual packings will nest into each other or be flat on one side and conical on the opposite side to form the end packings in a series with the conical faces outside for engagement by gland nuts and conical facings.

A packing according to the present invention is particularly suitable for use with steam, water, oil, petrol, air, ammonia, $CO_2$, methyl chloride or brine and in high speed rotary pumps pumping hot oil and as a positive seal in valves and shallow stuffing boxes, also with high speed high pressure reciprocating pumps and compressors.

For high pressure work it is advisable to use, between adjacent packing rings, spacer washers of compressed asbestos fibre or other suitable material.

As the compressibility of the packing is due primarily to the corrugations and the oil film between them and not to the material used in its manufacture it may be made by winding up a strip of thin corrugated plastic or other suitable material as an alternative to using ductile metal for this purpose.

What we claim is:

1. A self-lubricating packing for shafts comprising of at least a single length of a flat strip of foil with longitudinal corrugations extending throughout its length, and coated with lubricant on at least one face, said corrugated strip of foil being in the form of a spirally wound axially compressed ring with the corrugations extending longitudinally in the convolutions in nesting engagement with each other and transversely of the axis of the ring, and with the interengaging corrugations of the foil being flattened and permanently imprisoning the lubricant therebetween.

2. A method of making a self lubricating packing as in claim 1 which comprises the steps of coating a flat strip of foil with a lubricant, drawing the lubricant coated strip between corrugated pressure rollers so as to impress the strip throughout its length with a number of longitudinally extending corrugations, winding the lubricant covered corrugated strip spirally around a spindle to form body in the shape of a ring oversize as to height, and reducing said ring-shaped body in height by compressing the same in a mould through pressure applied in the direction of the axis of the ring.

References Cited in the file of this patent
UNITED STATES PATENTS

| | | |
|---|---|---|
| 1,543,963 | Walton | June 30, 1925 |
| 2,251,211 | Armstrong | July 29, 1941 |
| 2,281,195 | Jacobs | Apr. 28, 1942 |